United States Patent [19]
Freund et al.

[11] Patent Number: 5,852,732
[45] Date of Patent: Dec. 22, 1998

[54] HETEROGENEOUS OPERATIONS WITH DIFFERING TRANSACTION PROTOCOLS

[75] Inventors: Thomas Freund, Winchester; Robert Anthony Storey, Southhampton, both of United Kingdom

[73] Assignee: International Business Machines Corporation, Armonk, N.Y.

[21] Appl. No.: 735,626

[22] Filed: Oct. 23, 1996

[30]     Foreign Application Priority Data

May 24, 1996 [GB] United Kingdom .................... 9610993

[51] Int. Cl.⁶ ....................................... G06F 9/00
[52] U.S. Cl. ............................................. 395/671
[58] Field of Search ..................... 395/670, 671, 395/676, 674, 703; 707/8, 202

[56]            References Cited

U.S. PATENT DOCUMENTS

| | | | |
|---|---|---|---|
| 4,507,751 | 3/1985 | Gamlich et al. .......................... | 707/202 |
| 4,648,061 | 3/1987 | Foster .................................. | 395/200.58 |
| 4,677,611 | 6/1987 | Yanosy, Jr. et al. ..................... | 370/401 |
| 4,688,170 | 8/1987 | Waite et al. ............................ | 395/500 |
| 4,760,395 | 7/1988 | Katzeff et al. ......................... | 340/825.03 |
| 5,142,622 | 8/1992 | Owens ................................. | 395/200.57 |
| 5,258,982 | 11/1993 | Britton et al. ........................... | 370/408 |
| 5,261,089 | 11/1993 | Coleman et al. .......................... | 707/8 |
| 5,329,626 | 7/1994 | Klein et al. ........................ | 395/200.78 |
| 5,428,771 | 6/1995 | Daniels et al. ........................... | 395/575 |

FOREIGN PATENT DOCUMENTS

0465035 A2  1/1992  European Pat. Off. .

*Primary Examiner*—Majid A. Banankhan
*Attorney, Agent, or Firm*—Edward H. Duffield

[57]            ABSTRACT

The invention provides a mechanism to integrate differing transaction protocols by augmenting an existing Resource Manager to act as both a Transaction Manager and a Resource Manager within a system which also contains a standards-based Transaction Manager which has overall transaction management responsibility. The Transaction Manager within the Resource Manager acts as an interface to provide specific mappings between the Transaction Manager which has overall transaction management responsibility and a proprietary transaction processing system which it manages. The interface is required to map different transaction identification specifications, record appropriate state information and have procedures to effect failure and restart scenarios.

18 Claims, 2 Drawing Sheets

HETEROGENEOUS OPERATIONS WITH DIFFERING TRANSACTION PROTOCOLS

FIELD OF THE INVENTION

The present invention relates to the field of data processing, more specifically to transaction processing systems, and in particular to the interconnection of systems that use differing transaction protocols.

BACKGROUND ART

Computer implemented transaction processing systems are used for critical business tasks in a number of industries. A transaction defines a single unit of work that must either be fully completed or fully purged without action. For example, in the case of a bank automated teller machine (WP) from which a customer seeks to withdraw money, the actions of issuing the money, reducing the balance of money on hand in the machine and reducing the customer's bank balance must all occur or none of them must occur. Failure of one of the subordinate actions would lead to inconsistency between the records and the actual occurrences.

Distributed transaction processing involves a transaction that affects resources at more than one physical or logical location. In the above example, an transaction affects resources managed at the local device as well as bank balances managed by a bank's main computer. A distributed transaction may not be physically distributed but may involve cooperating tasks that must be completed in synchrony for successful transaction completion.

The X/Open Company Limited (X/Open is a trademark of X/Open Company Ltd.) has promulgated a guide that describes one model for implementing distributed transaction processing. The X/Open Guide, Distributed Transaction Processing: Reference Model, Version 2, November 1993, ISBN 1-85912-019-9 discloses, and FIG. 1 shows in block diagram form, a software architecture that allows multiple Application Programs (APs) 110 to share resources provided by one or more Resource Managers (RMs) 130 and allows their work to be coordinated by a Transaction Manager (TM) 120 into transactions. For clarity, FIG. 1 shows only a single Application Program 110 and a single Resource Manager 130. The Application Program 110 uses and modifies the resources controlled by one or more of the Resource Managers 130. The Transaction Manager 120 is responsible for global transactions and coordinates the decision whether to commit or roll-back the actions taken by the Resource Managers 130. (Commit causes the resources to be updated while roll-back causes all work to be discarded returning the resources to the state they were in upon transaction initiation.) The Resource Managers 130 manage specific resources. Resource Managers 130 may include a database management system (DBMS), a file system, or similar resource. A distributed transaction processing environment 122 provides an implementation specific definition of the transaction identifier and an implementation specific transaction protocol engine. It also provides for archiving of transaction state information (i.e. transaction outcome & transaction participant list) and a transaction execution context (i.e. mapping a transaction to a process execution instance (e.g. process or thread)), thus providing a degree of transparency to the user since the implementation specific transaction identifier is generally not passed directly back to the application.

The X/Open DTP model describes and many commercial transaction processing systems use what is termed a "two phase commit" to decide whether or not to commit the changes made by a transaction. The first phase involves the Transaction Manager 120 determining whether each of the Resource Managers 130 believes it is able to successfully commit the changes made by the transaction. If any Resource Manager 130 responds negatively, or fails to respond, the Transaction Manager 120 causes the changes to be rolled back in each Resource Manager 130. If all of the responses are positive, then the Transaction Manager 120 orders all of the Resource Managers 130 to commit the transaction.

FIG. 2 shows in block diagram form, a prior art transaction processing system including a conversion bridge 240 for connecting a second Transaction Manager 250 executing in a different environment to that of the distributed transaction processing environment 122. The conversion bridge is required to perform mappings between the two different environments, which includes the correlation of differing transaction identification specifications. It is also required to record appropriate state information, which requires a persistent archival of transaction and other gateway state information as well as to provide procedures to effect failure and restart scenarios, including the interpretation of differing commit protocols and the bridging of transaction commitment domains.

U.S. Pat. No. 5,428,771 discloses, and FIG. 3 shows in block diagram form, the system of FIG. 2 with the further addition of an application program 360 executing in a second distributed transaction processing environment 252. The transaction processing bridge 240 has the additional function of converting the respective transaction processing protocols of each system into protocols which can be utilised by the other system. For example, the distributed transaction processing environment 122 may be using the Two Phase Commit/Presumed Abort protocol of the AIX operating system and the second distributed transaction processing environment 252 may be using the Two Phase Commit/Presume Nothing protocol of SNA (AIX is a trademark of IBM Corporation). These protocols differ in that the Two Phase Commit/Presumed Abort presumes that in the absence of any information regarding a transaction's outcome the transaction is aborted. The SNA protocol presumes nothing regarding transaction outcome and maintains a list of transaction participants wherein Transaction Managers are required to exchange information among or between sites to determine the transaction outcome.

Bridge 240 is a part of the first distributed system environment and provides transparency between users of the first and second transaction processing systems. In some instances, the transaction processing bridge 240 will generate messages needed by one of the distributed transaction processing environments 122, 252. Also the bridge 240 may serve as a buffer, or filter to delete messages generated by one of the transaction processing environments 122, 252 which are not required by the other. Further, bridge 240 transfers, or ignores transaction state information between the first and second distributed systems. Whether the bridge transfers the state information, or ignores it depends upon the direction of the flow of information between the two systems. Thus, in this manner it can be seen how transaction processing bridge 240 provides for transparency between users of applications running on either the first distributed transaction processing environment 122 or the second distributed transaction processing environment 122.

The prior art described above uses a direct transaction protocol conversion gateway to convert between the protocols of the first distributed transaction processing environment 122 and the second distributed transaction processing environment 252. For each different protocol to be connected together, a different transaction processing bridge 240 is required.

Even with protocol conversion from the first protocol to the second, some aspects of the first protocol may be visible to a user operating in the second distributed transaction processing environment 252.

SUMMARY OF THE INVENTION

Accordingly the invention provides a resource manager for a distributed transaction processing system, the transaction processing system also comprising a first transaction manager using a first transaction processing protocol to process transactions initiated by one or more application programs, the resource manager being compliant with said first transaction processing protocol, and comprising: means for registering the resource manager with said first transaction manager.

The invention is characterised in that the resource manager further comprises: means for initiating a transaction in a second transaction manager in order to access a further resource manager; means, responsive to a two phase commit protocol from said first transaction manager, for initiating a two phase commit protocol with said second transaction manager; and means, responsive to said two phase commit protocol initiated with said second transaction manager, for responding to said two phase commit protocol with said first transaction manager.

In a preferred embodiment the resource manager further comprises means for protocol conversion from a first transaction processing protocol to a second transaction processing protocol and from a second transaction processing protocol to a first transaction processing protocol, said second transaction processing protocol being used by a second transaction manager. Alternatively two X/Open compliant transaction services may be connected together without protocol conversion. In this case the invention allows one transaction service to act as subservient to the other.

The invention also provides a distributed transaction system comprising: a second resource managers; a first distributed transaction manager; a second distributed transaction manager; and a first resource manager as described above.

The invention further provides a method for using a second transaction processing protocol in a distributed transaction processing system, the transaction processing system also comprising a first transaction manager using a first transaction processing protocol to process transactions initiated by one or more application programs, the resource manager being compliant with said first transaction processing protocol, the method comprising the steps of: registering a resource manager with said first transaction manager.

The method is characterised in that it further comprises the steps of: said resource manager initiating a transaction in a second transaction manager; said first transaction manager initiating a two phase commit protocol with said resource manager; said resource manager initiating a two phase commit protocol with said second transaction manager; said second transaction manager responding to said two phase commit protocol initiated by said resource manager; and said resource manager responding to said two phase commit protocol initiated by said first transaction manager.

In a preferred embodiment, the method further comprises the step of protocol conversion from a first transaction processing protocol to a second transaction processing protocol and from a second transaction processing protocol to a first transaction processing protocol, said second transaction processing protocol being used by a second transaction manager.

Preferably the resource manager further comprises means for persistently recording transaction state data. In a preferred embodiment this transaction state data includes a first transaction id associated with said first transaction processing protocol, a second transaction id associated with said second transaction processing protocol and restart information for the transaction.

In a preferred embodiment the second transaction processing protocol is a proprietary protocol, such as used, for example, by the Encina transaction monitor from Transarc Corporation (Encina is a trademark of Transarc Corporation). Also, in a preferred embodiment, the first transaction processing protocol is a standards-based protocol, such as a protocol that conforms to the X/Open XTP model. This has the advantage that standards-based models and programming interfaces are used, in preference to constructing a direct transaction protocol conversion gateway. The details of the second transaction processing protocol are hidden from the application program writer and the end-user.

DETAILED DESCRIPTION OF THE PREFERRED EMBODIMENTS

Figure 1:
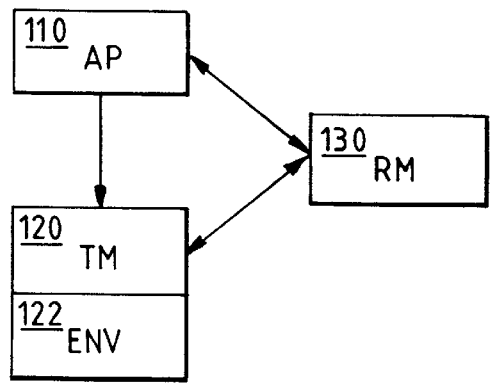
FIG. 1 shows a block diagram of a prior art X/Open compliant transaction system.
Figure 2:
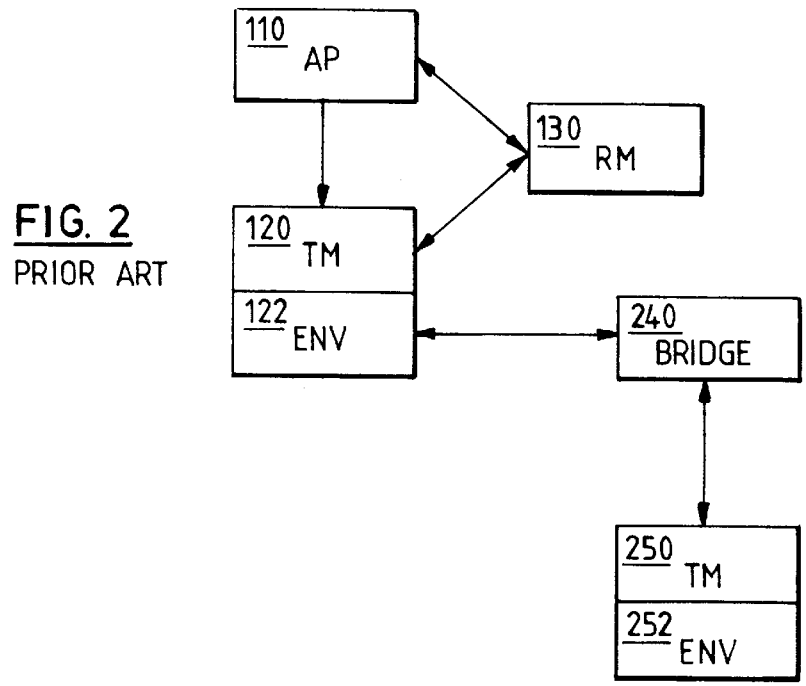
FIG. 2 shows a block diagram of the prior art system of FIG. 1, including a prior art transaction processing bridge.
Figure 3:
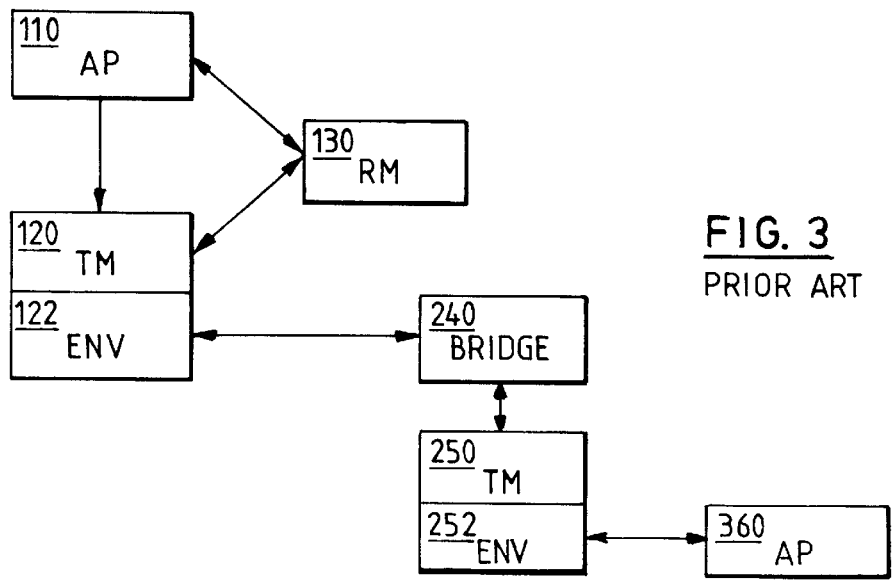
FIG. 3 shows a block diagram of the prior art system of FIG. 2, further including a second application program.
Figure 4:
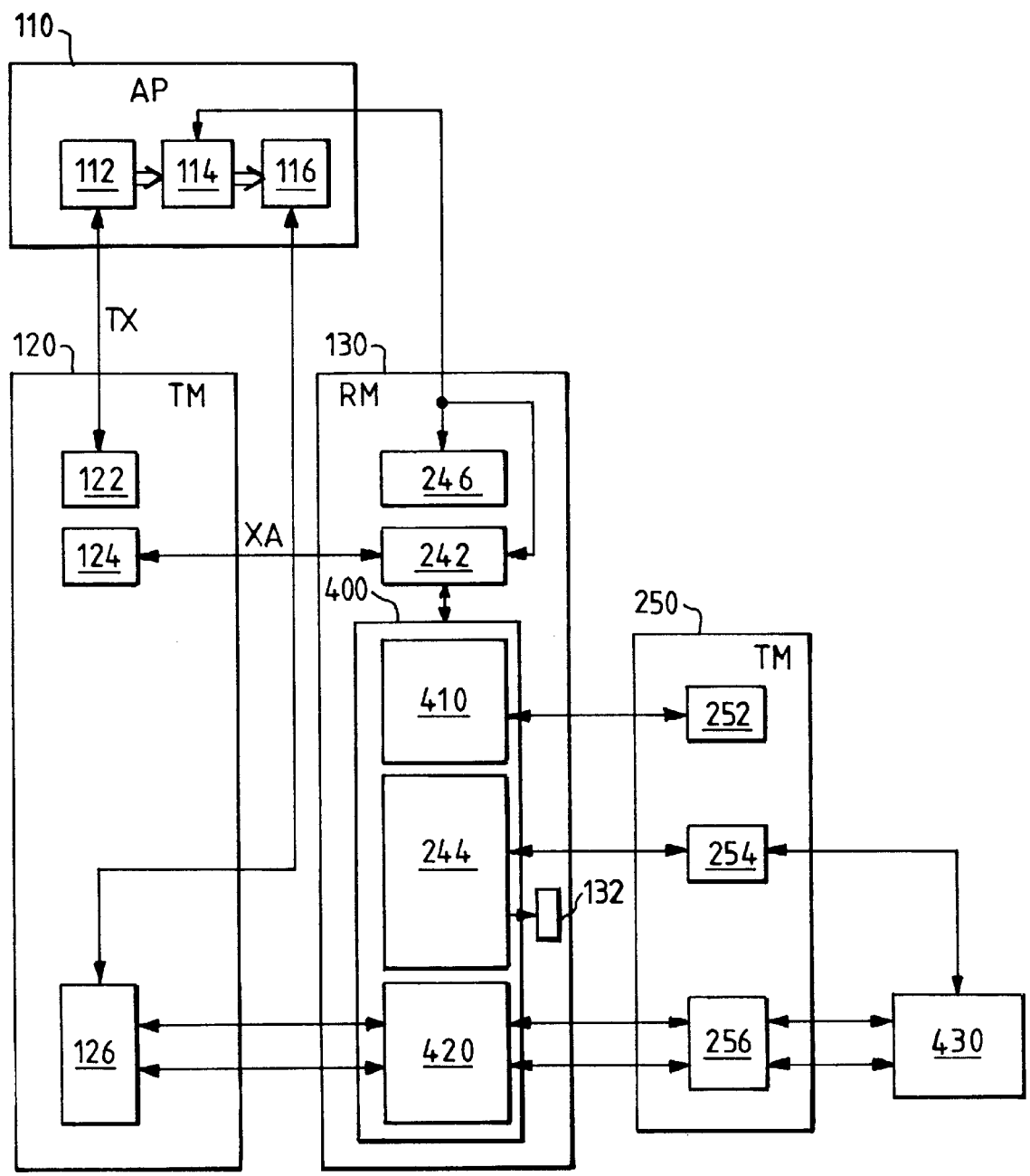
FIG. 4 shows a block diagram of an embodiment of an X/Open compliant transaction system according to the present invention.

FIG. 4 shows, by way of example, a first embodiment of an X/Open compliant transaction system according to the present invention. The Application Program 110 initiates a transaction which is managed by the Transaction Manager 120. The transaction uses resources which are managed by the Resource Manager 130. Included within the Resource Manager 130 is an interface 400 to a second Transaction Manager 250 having its own resources 430. The second Transaction Manager 250, operating in a different distributed transaction processing environment, can be updated within the scope of the transaction initiated by the Application Program 110.

The Application Program 110 uses the X/Open TX (Transaction Demarcation) Interface to communicate with the Transaction Manager 120 in order to begin a transaction. This step is indicated in FIG. 4 by the reference numeral 112 in the Application Program 110 and by the reference numeral 122 in the Transaction Manager 120. The TX Interface is an application programming interface (API) by which an X/Open compliant Application Program calls an X/Open compliant Transaction Manager to demarcate global transactions and direct their completion. Further details of the TX interface can be found in X/Open Specification C504 ISBN 1-85912-094-6.

The Transaction Manager 120, in response to a request to begin a transaction from the Application Program 110 associates the transaction with an execution context. By doing so the Transaction Manager 120 frees the Application Program 110 from having to track a specific transaction identifier itself. The Transaction Manager 120 also initiates the appropriate structures to track both transaction participant information and any outcome data. A transaction id is returned to the Application Program 110.

The Application Program 110 uses the Resource Manager API to initialise a Resource Manager which then awaits input. This step is indicated in FIG. 4 by the reference numeral 114 in the Application Program 110 and by the reference numeral 246 in the Resource Manager 130. The Resource Manager API (RM API) to the Application Program 110 is defined for each Resource Manager 130 by the provider of that Resource Manager 130, such as the ISAM API, from IBM Corporation or the Resource Manager API uses an industry standard Resource Manager API, such as the SQL API.

The Application Program 110 then executes the transaction. In its simplest form, the transaction consists of the following steps:

1. Begin Transaction—X/Open
2. Perform Resource Manager operations
3. End Transaction—X/Open During this execution, the Application Program 110 will need, in step 2 above, to perform operations on resources owned by Resource Managers. It communicates these requests using the RM API mentioned above, including within the communication the transaction id (known as Xid in X/Open compliant systems). When a request is received by the Resource Manager 130, the Resource Manager 130 registers with the Transaction Manager 120 using an ax_reg( ) call from the X/Open XA Interface. This call includes the transaction id (Xid) that was received with the request. This step is indicated in FIG. 4 by the reference numeral 242. This ensures that when the outcome of the transaction having a transaction id of Xid is to be decided, the Resource Manager 130 is involved in the two phase commit process.

The Transaction Manager 120 and the Resource Manager 130 use the X/Open XA Interface to communicate with each other. The XA Interface is a programming interface by which an X/Open compliant Transaction Manager 120 communicates with a local Resource Manager 130. Further details of the XA interface can be found in X/Open Specification C193 ISBN 1-872630-24-3.

The steps described above all occur in a conventional X/Open compliant transaction system. In a prior art system where the Resource Manager 130 manages a resource, the requests which the application program makes to update resources would be carried out in a conventional manner. These requests continue until the Resource Manager 130 is asked by the Transaction Manager 120, in response to an "End Transaction" request from the Application Program 110, to prepare its resources.

In the present invention, an X/Open compliant Resource Manager 130 is modified so that it has an additional function as a Transaction Coordinator for a separate nested transaction. The Resource Manager, in effect, interacts in a similar manner with the second Transaction Manager 250 to the manner in which the Application Program 110 interacts with the first Transaction Manager 120. Transactions are begun, operations are completed and transactions are ended. In a distributed system, the transaction may require resources 430 managed by a second Transaction Manager 250. The second Transaction Manager 250 is not X/Open compliant and therefore cannot be accessed directly by Application program 110. The steps to be described now are additional steps which are performed, according to the present invention, for each request to the Resource Manager 130 which is to be handled by involving a second Transaction Manager 250 and its resources 430.

On receiving a request from the Resource Manager 130 which is to be handled by the second Transaction Manager 250, the interface 400 to the second Transaction Manager 250 uses the Transaction Manager's 250 own API to begin a transaction. This step is indicated in FIG. 4 by the reference numeral 410 in the interface 400 and by the reference numeral 252 in the second Transaction Manager 250. In a preferred embodiment the second Transaction Manager 250 is the Encina Transaction Manager available from Transarc Corporation and the relevant call to begin a transaction is "Begin_Tran( )". The transaction in the second Transaction Manager 250 has a transaction id of, for example, Tid. Note that this differs from the transaction id of, for example, Xid for the transaction begun in the X/Open compliant Transaction Manager. The second Transaction Manager 250 transaction id is returned via the Transaction Manager's own API to the interface 400. The interface 400 records transaction state data in a log 132 which the Resource Manager 130 maintains. This state data includes the X/Open Transaction Manager 120 transaction id (Xid), the second Transaction Manager 250 transaction id (Tid) and restart information such as the reference or the address of the X/Open Transaction Manager 120 and the second Transaction Manager 250.

Once the transaction in the second Transaction Manager 250 has begun, then operations contained in requests from the Resource Manager 130 are passed to the second Resource Manager 430 for execution. These operations are indicated in FIG. 4 by the reference numeral 244 in the interface and reference numeral 254 in the second Transaction Manager, and have a similar function to operations which would, in the prior art, be handled locally in the Resource Manager 130 itself. The Resource Manager 130 may have performed operations on Resource Manager 430 to ensure that it is in an appropriate state, for example, initialisation. An example of such an operation is to call a function through the Encina Peer-to-Peer Communications (PPC) Gateway to, for example, access a database stored on a mainframe computer. The function performed by the Encina Peer-to-Peer Communications (PPC) Gateway is indicated in FIG. 4 by the reference numeral 430. The Encina PPC Gateway will register the function it performs with the Encina Transaction Manager, using, in this example, a transaction id of Tid. This ensures that when the outcome of the transaction having a transaction id of Tid in the second Transaction Manager is to be decided, the Encina PPC Gateway is involved in the two phase commit process. The interface function 244 performs a mapping from the Resource Manager 130 transaction id Xid to the second Transaction Manager 250 transaction id Tid.

The Application Program 110 uses the X/Open TX (Transaction Demarcation) Interface to communicate with the Transaction Manager 120 in order to end the transaction. This step is illustrated in FIG. 4 by the reference numeral 116 in the Application Program 110. This communication includes the X/Open compliant Transaction Manager's 120 transaction id, in this case, Xid. The Transaction Manager 120, in response to the request from the Application Program 110 to end the transaction, issues an xa_prepare( ) call from the X/Open XA Interface to the Resource Manager 130. This call includes the transaction id (Xid) that was received with the request. This step is indicated in FIG. 4 by the reference numeral 126. In accordance with the present invention, the interface within the X/Open compliant Resource Manager 130, indicated in FIG. 4 by the reference numeral 420, issues a call to the second Resource Manager 430 to prepare its resources. This call has had the Transaction Manager 120 transaction id Xid mapped to the second Transaction Manager 250 transaction id Tid. The second Resource Manager 430 prepares its resources and returns a prepared indication to the interface 420, which in turn returns a prepared indication to the Transaction Manager 120.

When the Transaction Manager 120 has received "prepared" indications from all of the participants in the transaction, it issues an X/Open XA Interface xa_commit( ) call to the Resource Manager 130. This call includes the transaction id (Xid) that was received with the request. This step is also indicated in FIG. 4 by the reference numeral 126. In accordance with the present invention, the interface within the X/Open compliant Resource Manager 130, indicated in FIG. 4 by the reference numeral 420, issues a call to the second Resource Manager 430 to commit its resources, having mapped Xid to Tid. The second Resource Manager 430 commits its resources and returns a committed indication to the interface 420, which in turn returns a committed indication to the Transaction Manager 120, after mapping Tid to Xid. As is well known in the art, should any of the resources not be prepared to commit, then the relevant indications are returned to the Transaction Manager 120 and in place of the commit call (xa_commit( )), a rollback call (xa_rollback) is issued. The Application Program 110 may have decided to rollback directly or one of the participants in the two phase commit process may have responded that it is not prepared to commit the resources. In either of these cases the Transaction Manager 120 issues a rollback call.

In a second embodiment of an X/Open compliant transaction system according to the present invention, the Transaction Manager 120 may be, for example, the TopEnd product from NCR, which runs on the UNIX operating system (UNIX is a registered trademark in the United States and other countries licensed exclusively through X/Open Company Ltd). The first Resource Manager 130 may be, for example, the CICS Gateway Program from IBM Corporation, which runs on an IBM mainframe system. (IBM and CICS are trademarks of IBM Corporation.) Included within the first Resource Manager 130 is an interface 400 to a second Transaction Manager 250 having its own resources 430. The second Transaction Manager may be, for example, the Encina product from Transarc Corp. which runs on the AIX operating system. (Transarc and Encina are trademarks of Transarc Corporation and AIX is a trademark of IBM Corporation). The second Transaction Manager 250, operating in a different distributed transaction processing environment, can be updated within the scope of the transaction initiated by the Application Program 110.

The operations completed within the first Resource Manager 130 are the same as in the first embodiment described above.

In the second embodiment, a user may then integrate the front-end tools of a particular Transaction Manager 120 with the gateway capabilities of a particular Resource Manager 130. The front-end tools may, for example, include system management interfaces. They may then be used in conjunction with an existing system connected by a protocol that uses two-phase commit semantics.

We claim:

1. A resource manager for a distributed transaction processing system, the transaction processing system also comprising a first transaction manager using a first transaction processing protocol to process transactions initiated by one or more application programs, the resource manager being compliant with said first transaction processing protocol, and comprising:

means for registering the resource manager with said first transaction manager;

characterised in that the resource manager further comprises:

means for initiating a transaction in a second transaction manager in order to access a further resource manager;

means, responsive to a first two phase commit protocol from said first transaction manager, for initiating a second two phase commit protocol with said second transaction manager; and means, responsive to said second two phase commit protocol initiated with said second transaction manager, for responding to said first two phase commit protocol with said first transaction manager.

2. A resource manager as claimed in claim 1 further comprising means for protocol conversion from a first transaction processing protocol to a second transaction processing protocol and from a second transaction processing protocol to a first transaction processing protocol, said second transaction processing protocol being used by the second transaction manager.

3. A resource manager as claimed in claim 1 further comprising means for persistently recording transaction state data.

4. A resource manager as claimed in claim 3 wherein said transaction state data includes a first transaction identifier associated with said first transaction processing protocol, a second transaction identifier associated with said second transaction processing protocol and restart information for the transaction.

5. A resource manager as claimed in claim 4 wherein said first transaction processing protocol conforms to the X/Open XTP mode.

6. An distributed transaction system comprising:

a second resource manager;

a first distributed transaction manager;

a second distributed transaction manager; and a first resource manager comprising means for registering the first resource manager with said first transaction manager;

characterised in that the first resource manager further comprises:

means for initiating a transaction in a second transaction manager in order to access a further resource manager;

means, responsive to a first two phase commit protocol from said first transaction manager, for initiating a second two phase commit protocol with said second transaction manager; and means, responsive to said second two phase commit protocol initiated with said second transaction manager, for responding to said first two phase commit protocol with said first transaction manager.

7. A resource manager as claimed in claim 6 further comprising means for protocol conversion from a first transaction processing protocol to a second transaction processing protocol and from a second transaction processing protocol to a first transaction processing protocol, said second transaction processing protocol being used by the second transaction manager.

8. A resource manager as claimed in claim 6 further comprising means for persistently recording transaction state data.

9. A resource manager as claimed in claim 8 wherein said transaction state data includes a first transaction identifier associated with said first transaction processing protocol, a second transaction identifier associated with said second transaction processing protocol and restart information for the transaction.

10. A resource manager as claimed in claim 9 wherein said first transaction processing protocol conforms to the X/Open XTP model.

11. A method for using a second transaction processing protocol in a distributed transaction processing system, the transaction processing system also comprising a first transaction manager using a first transaction processing protocol to process transactions initiated by one or more application programs, the resource manager being compliant with said first transaction processing protocol, the method comprising the steps of:

registering a resource manager with said first transaction manager;

characterised in that the method further comprises the steps of:

said resource manager initiating a transaction in a second transaction manager;

said first transaction manager initiating a first two phase commit protocol with said resource manager;

said resource manager initiating a second two phase commit protocol with said second transaction manager;

said second transaction manager responding to said first two phase commit protocol initiated by said resource manager; and said resource manager responding to said second two phase commit protocol initiated by said first transaction manager.

12. A method as claimed in claim 11 further comprising the step of protocol conversion from a first transaction processing protocol to a second transaction processing protocol and from a second transaction processing protocol to a first transaction processing protocol, said second transaction processing protocol being used by a second transaction manager.

13. A method as claimed in claim 11 further comprising the step of persistently recording transaction state data.

14. A method as claimed in claim 13 wherein said first transaction processing protocol conforms to the X/Open XTP model.

15. A computer program product on a computer readable memory for using a second transaction processing protocol in a distributed transaction processing system, the transaction processing system also comprising a first transaction manager using a first transaction processing protocol to process transactions initiated by one or more application programs, the resource manager being compliant with said first transaction processing protocol, the computer program product comprising:

means for registering a resource manager with said first transaction manager;

characterised in that the computer program product further comprises:

means for initiating, by said resource manager, a transaction in a second transaction manager;

means for initiating, by said first transaction manager, a first two phase commit protocol with said resource manager;

means for initiating, by said resource manager, a second two phase commit protocol with said second transaction manager;

means for responding, by said second transaction manager, to said first two phase commit protocol initiated by said resource manager; and means for responding, by said resource manager, to said second two phase commit protocol initiated by said first transaction manager.

16. A computer program product as claimed in claim 15 further comprising means for protocol conversion from a first transaction processing protocol to a second transaction processing protocol and from a second transaction processing protocol to a first transaction processing protocol, said second transaction processing protocol being used by a second transaction manager.

17. A computer program product as claimed in claim 15 further comprising means for persistently recording transaction state data.

18. A computer program product as claimed in claim 17 wherein said first transaction processing protocol conforms to the X/Open XTP model.

* * * * *